(12) United States Patent
Nip

(10) Patent No.: US 6,820,078 B2
(45) Date of Patent: Nov. 16, 2004

(54) METHOD AND SYSTEM FOR THE AUTOMATED COLLECTION AND DISPLAY OF DATABASE INFORMATION VIA A COMMUNICATIONS NETWORK

(76) Inventor: Kevin Nip, 5742 Ross Street, Vancouver, British Columbia (CA), V5W 3L4

( * ) Notice: Subject to any disclaimer, the term of this patent is extended or adjusted under 35 U.S.C. 154(b) by 392 days.

(21) Appl. No.: 10/143,345

(22) Filed: May 9, 2002

(65) Prior Publication Data

US 2003/0212682 A1 Nov. 13, 2003

(51) Int. Cl.7 ............................................. G06F 17/30
(52) U.S. Cl. ................................................. 707/3; 707/10
(58) Field of Search ............................. 707/1, 3, 9, 10; 709/201, 217

(56) References Cited

U.S. PATENT DOCUMENTS

| | | | |
|---|---|---|---|
| 4,956,769 A | * | 9/1990 | Smith ............................. 707/9 |
| 5,778,367 A | | 7/1998 | Wesinger, Jr. et al. |
| 5,819,282 A | | 10/1998 | Hooper et al. |
| 5,884,317 A | | 3/1999 | Cline et al. |
| 5,926,637 A | | 7/1999 | Cline et al. |
| 5,983,227 A | | 11/1999 | Nazem et al. |
| 6,006,242 A | | 12/1999 | Poole et al. |
| 6,052,696 A | * | 4/2000 | Euler et al. ................. 707/202 |
| 6,192,382 B1 | | 2/2001 | Lafer et al. |
| 6,247,047 B1 | * | 6/2001 | Wolff ......................... 709/219 |
| 6,289,347 B1 | | 9/2001 | Giroux |
| 6,317,783 B1 | | 11/2001 | Freishtat et al. |
| 6,324,538 B1 | | 11/2001 | Wesinger, Jr. et al. |
| 6,336,116 B1 | | 1/2002 | Brown et al. |
| 6,721,732 B2 | * | 4/2004 | Lawton ......................... 707/3 |

* cited by examiner

*Primary Examiner*—Jack M Choules

(57) ABSTRACT

A method and system for gathering end-user data over a network infrastructure using input pages generated from Requestor specifications and for outputting end-user data based on output generated from Requestor specifications by using a common identifier to maintain associations with the required data information and the Requestor input and output specifications.

15 Claims, 27 Drawing Sheets

Login

Enter Username:\_\_\_\_\_
Enter Password:\_\_\_\_\_

Submit

New Sign-up

Fig. 2A

Selection Page

1. Add Input Specifications

2. Add Output Specifications

3. Update Input Specifications

4. Update Output Specifications

Fig. 2B

1. Add Input Specifications
Select Input Page

Add Input Specifications to which input page?
o  input page1
o  input page2
o  input page3 o  create a new input page

Cancel

Fig. 2C

Enter Input Specifications

Choose a Field Type to add:
o text
o integer
o date-time
} 201 field type input

Choose field display name:
golfer name
} 202 display details

Choose validation information:
o required field?
o limit input length to ____
} 203 validation details Submit  Cancel

Fig. 2D

Choose an input record to update:
- input record1
- input record2
- input record3

Cancel

Fig. 2G

Update Input Specifications
Update: input page 1

Update Field Type:
- text
○ integer
○ date-time

Update field display name:
golfer name

Update validation information:
- required field?
○ limit input length to ____

Submit   Cancel

Fig. 2H

The input information has been updated.

return to main menu

2. Add Output Specifications
Select Output Page

Add Output Specifications to which output page?
o  output page1
o  output page2
o  output page3 o  create a new output page

Cancel

Fig. 2J

Enter Output Specifications

Choose a Field to display:
o name
o e-mail
o skill level

} 204 field selection

Choose field font:
o black
o red
o green

} 205 display details

Submit  Cancel

Fig. 2K

The output field has been added.

return to main menu

Fig. 2L

**4. Update Output Specifications
Choose Output Page**

Choose an output page to update:
- output page1
- output page2
- output page3

Cancel

Fig. 2M

Update Output Specifications
Update: output form1

Update Field to display:
- name
○ e-mail
○ skill level

Update field font:
- black
○ red
○ green

Submit   Cancel

Fig. 20

The output information has been updated.

return to main menu

Fig. 2P

Output Display Request

Choose records to display
● all records
○ a-z records

Search Criteria
level=4

<u>Submit</u>  <u>Cancel</u>

} end-user search information

Fig. 2Q

Output Display Result 1 results record

| name | e-mail | level |
|------|--------|-------|
| bob | bob@bob.com | 4 |

Fig. 2R

Enter User Data

1. Enter Name: Bob
2. Enter e-mail: bob@bob.com } end-user input information
3. Enter Skill level: 4

Submit  Cancel

Fig. 2S

Your submission has been entered.

Thank you!

Fig. 2T

METHOD AND SYSTEM FOR THE AUTOMATED COLLECTION AND DISPLAY OF DATABASE INFORMATION VIA A COMMUNICATIONS NETWORK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to a computer method and system for gathering and displaying information, particularly to a method and system for gathering and displaying information over the Internet.

The Internet and the World Wide Web (the "web") in particular has experienced tremendous growth in the past several years. The web service allows a server system to send graphical web pages of information to a remote client system. Web documents are typically defined using Hyper Text Markup Language ("HTML"), a computer language which provides a standard set of tags that define how a web page is to be displayed. Each web resource is uniquely identifiable by a Uniform Resource Locator ("URL"). To view a specific web page, a client computer system specifies the URL for that web page in a request sent to the server system. On-line tools exist which permit the creation of an informational web page or group of web pages with little or no programming know-how. The web-site created using these resources becomes instantly available and accessible world-wide using a client system.

Special purpose web-site creation tools such as those for creating catalogs exist to facilitate the collection of specific information such as orders (e.g. http://www.createastore.com). These are adequate if informational requirements fit a particular model (e.g. the purchasing model) and if data needs don't change frequently. However, it is still very difficult to gather and display customized elements of information which do not fit a particular model. To collect such customized elements of information typically necessitates enlisting the aid of a specialist such as a programmer to create a customized database-enabled web-site or database access application.

These database access applications have recently gained popularity on the web. These systems essentially require three additional components: (1) a database for the storage and retrieval of user-entered data, (2) input pages for the collection of data to populate the database, and (3) output pages for the display of the entered data. Each component must be created and the associations between each must be maintained and kept current. Typically the components are manually created and the associations between the database, input pages and output pages are established at the time of creation of the system. Where data requirements subsequently change, however, the database and associated input and output pages which depend upon the database are manually updated. This manual revision process is not immediate and not conducive to frequent changes. Moreover, keeping database associations with the input and output pages is especially difficult where subsequent changes are made by another person since the creation of the database, input pages, and output pages may not have been standardized. This is especially problematic in situations where data requirements change quickly and/or frequently.

There are tools that can assist in this process but these typically necessitate using additional off-line development tools and thus the results again are not immediate. As well, these development tools often require specialized programming skill, additional hardware or additional software. On-line tools exist to provide discrete packages to deal with parts of the problem. For instance, form generation tools (e.g. http://www.createforms.com) may deal with the input page aspect but do not deal with the output page or database association aspects. Moreover, such a piece-meal approach does not result in an integrated and coordinated solution.

Thus the process of gathering and displaying end-user data containing customized elements of data is inconvenient and unsatisfactory. What is needed then is a system that overcomes the foregoing disadvantages.

BRIEF SUMMARY OF THE INVENTION

The present invention, generally speaking, uses a computer network and a database to provide a dynamic information system in which the information content and the display of the information content is based on requirements entirely user-specified and associated with a requester identifier. Requests are received from individual users of the computer network, Requestors, to electronically gather information. Input and output specification requirements are received from the Requestor and stored in dynamic format with an associated identifier and requestor identifier. Entries from individual users, end-users, containing the information to be electronically stored are sent along with the requestor identifier and input identifier and validated using the associated specifications and if valid are automatically collected and stored in the database in searchable and retrievable form. Entries are made accessible on the computer network when valid requestor identifier and output identifier are received from an end-user along with the request. In response to end-user requests, the database is searched and entries are retrieved based on dynamic search specifications and display specifications of the associated requestor identifer and output identifier. Entries are served to end-users in a hardware-independent page description language.

DETAILED DESCRIPTION OF THE INVENTION

Figure 1:
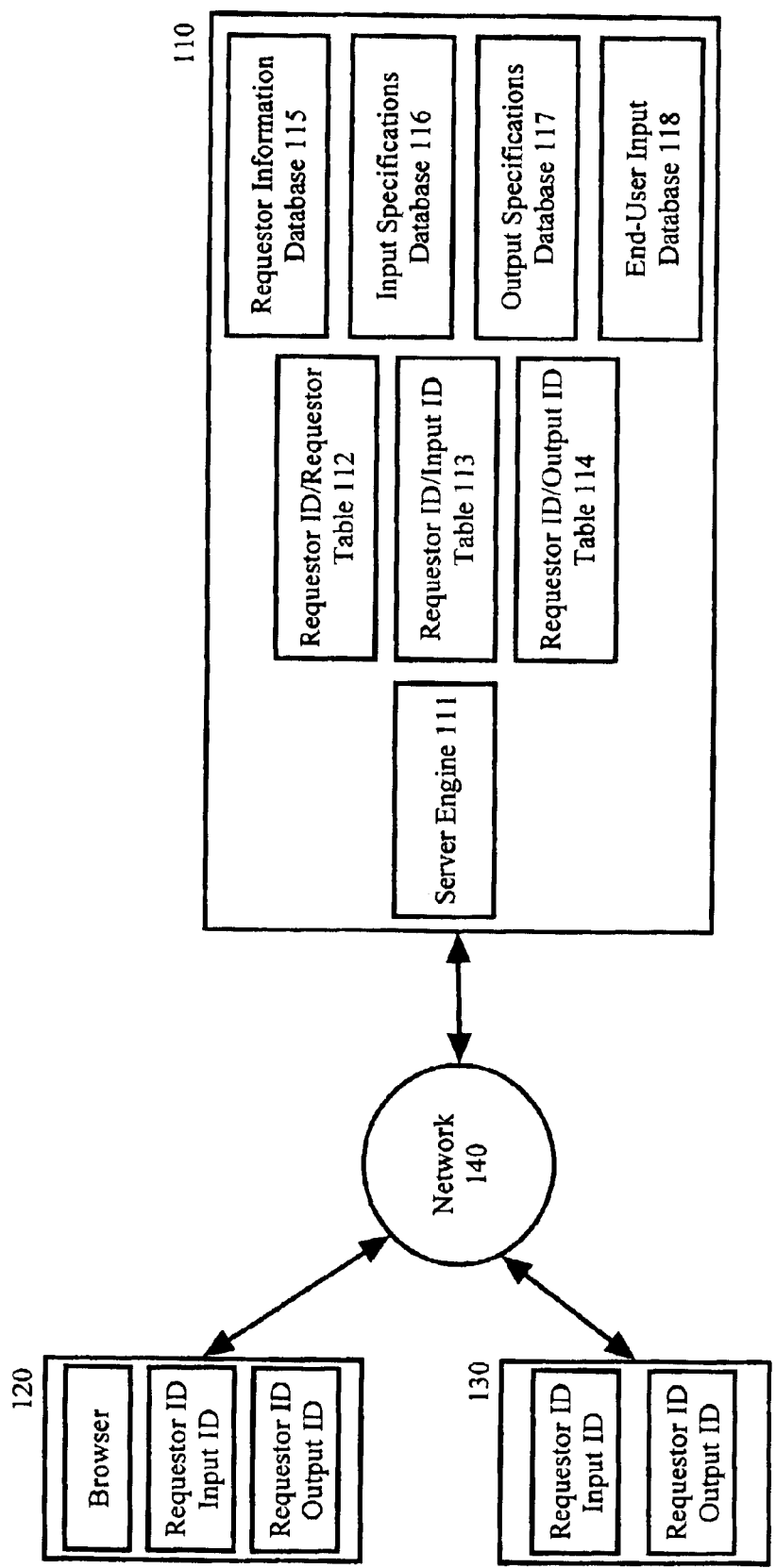
FIG. 1 is a block diagram illustrating an embodiment of the present invention.

FIG. 1 is a block diagram illustrating an embodiment of the present invention. The server system 110 includes a server engine 111, a requestor identifier/requestor table 112, a requestor identifier/input identifier table 113, a requestor identifier/output identifier table 114, a requester information database 115, a requestor input specifications database 116, a requestor output specifications database 117, and an end-user input database 118.

The server engine receives requests to access web pages identified by URL and provides the web pages to the various client systems. Each such request includes an accompanying requestor identifier along with either an input or an output identifier to effect a database interaction function.

The requester information database 115 contains requester information for various requestors. The requestor information includes user-specific information such as name information, address information, and other authentication information.

The input specifications database 116 contains input specifications information. Input specifications information includes database field information and field validation information which aid in defining what information will be accepted from the end-user by defining the database structure and acceptable input values.

The output specifications database 117 contains output specifications information. Output specifications information includes database field information and field display information which aid in defining what information will be displayed and how it will be displayed to an end-user.

The end-user input database 118 contains end-user entered information. End-user entered information includes information which has been entered by a user and which has been validated and found to comply with the associated input specifications information in the input specifications database 116.

The requester identifier/requestor information table 112 contains a mapping from each globally unique requestor identifier that identifies requestor information associated with the requestor identifier.

The requestor identifier/input table 113 contains a mapping from each requestor identifier-input identifier combination to the associated input specifications information in the input specifications database 116.

The requestor identifier/output table 114 contains a mapping from each unique requestor identifier-output identifier combination to the associated output specifications information in the output specifications database 117.

The client system 120 contains a browser and an assigned requestor identifier. In one embodiment, the server system assigns and sends the requestor identifier to the client system once when the client system first interacts with the server system. From then on, the client system includes its requestor identifier with all messages sent to the server system so that the server system can identify the source of the message.

In an alternate embodiment, the requestor identifier is assigned after user authentication such as after the provision of a valid password or user sign-up information. The client system in 120 can also contain an input identifier or an output identifier depending on the options the client system selects. In one embodiment, the server system assigns an input identifier once valid input specifications information along with an authenticated requester identifier has been submitted to the server system. In another embodiment, the server system assigns an output identifier once valid output specifications information along with an authenticated requestor identifier has been submitted to the server system.

The client system 130 contains a browser which is used to make page requests to the server system. Each request made to the server system is accompanied by a requester identifier and either an input identifier or output identifier depending on the desired function the client system wishes to perform.

The server system and client systems interact by exchanging information via a communications network link 140, which may include the Internet. One skilled in the art would appreciate that the system can be used in various environments other than the Internet. Various communication channels may be used such as local area network, wide area network, or point-to-point dial up connection. Also, a server system may comprise any combination of hardware or software that can accept and use requestor identifier and input or output identifiers in the manipulation of data in response to receipt of a client system page request accompanied by the requester identifier and input or output identifiers. A client system may comprise any combination of hardware or software that can interact with the server system. These systems may include television-based systems, touch-screen system or various other consumer products through which a requester identifier and an input identifier or output identifier may be passed.

In order to convey the manner in which the automated gathering and display of information is used, screen displays of the graphical user interface will now be described.

When a requester wishing to gather and display customized information first visits the site, he or she is presented with an authentication screen for login or sign-up like FIG. 2A. After authentication, the client system is assigned a requestor identifier and presented with a selection page FIG. 2B.

If Add Input Specifications is chosen, the user is presented with a selection page FIG. 2C listing previously entered input pages and an option to create a new input page. If the user chooses to create a new input page, the requestor identifier is sent to the server system along with the request to create a new input page and the server system assigns a new input identifier and sends the identifier to the client system. If the user chooses to add a new input specification to an existing input page, the user selects the relevant page and the input identifier is set at the client system.

Figure 2E:
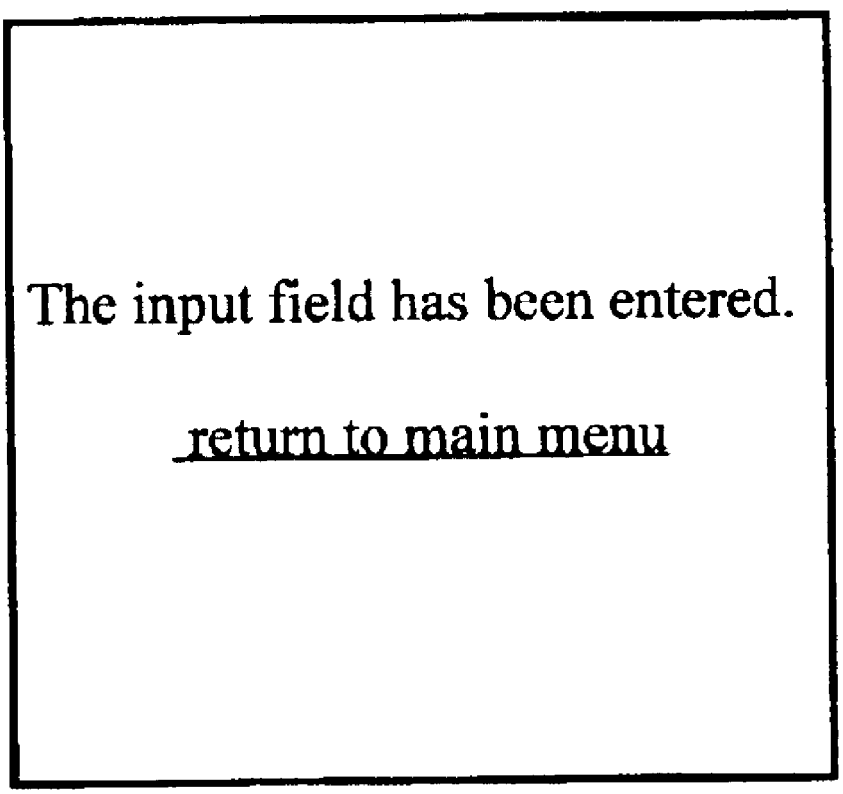
FIG. 2A through FIG. 2T are screen displays showing use of the system and method of the present invention.

The user is then presented with a web page, FIG. 2D, showing input specifications information that may be entered for the chosen input identifier. This example web page contains a field type input section 201 containing one or more selection boxes to indicate the database field options corresponding to the various database field options available for a new input field, a display details section 202, and a validation details section 203. One skilled in the art would appreciated that these sections can be rearranged, adapted or omitted in various ways. When the user enters the information in the fields and selects Submit, the information is sent along with the requestor identifier and the input identifier. The server system returns a confirming web page FIG. 2E.

Figure 2F:
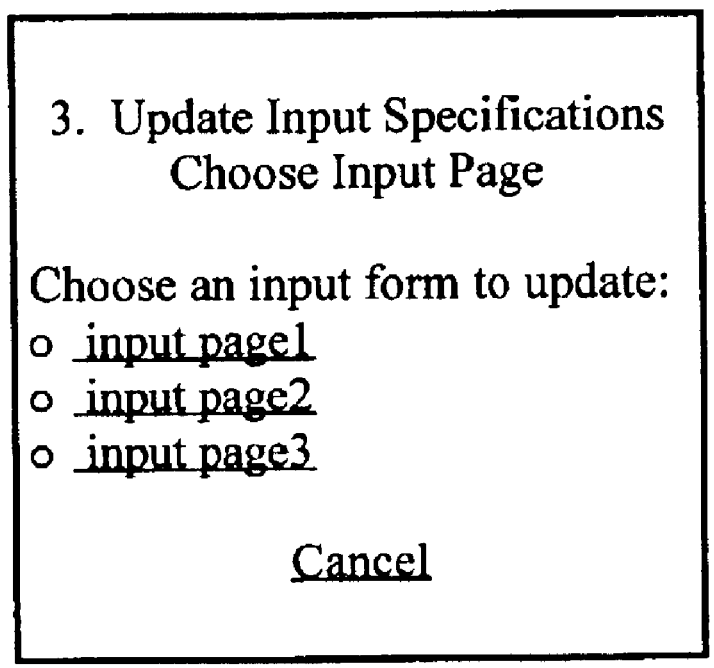
Figure 2I:
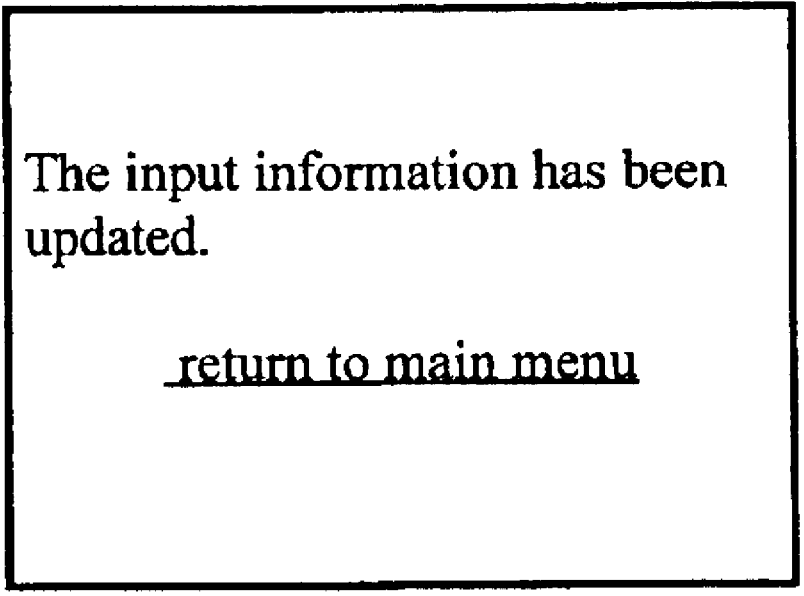

If Update Input Specifications is chosen, the user is presented with a selection page FIG. 2F listing previously entered input pages. The user selects the relevant input page and the input identifier is set at the client system. The user is then presented with a web page, FIG. 2G, showing input specifications records for the chosen input page. The user selects the relevant input specifications record and the input record identifier is set at the client system. The user is then presented with a web page, FIG. 2H, showing input specifications information that have previously been entered. When the user edits the entry to his or her satisfaction and selects Submit, the information is sent along with the requestor identifier, input identifier and input record identifier. The user is then presented with a confirming web page FIG. 2I.

If Add Output Specifications is chosen, the user is presented with a selection page FIG. 2J listing previously entered output pages and an option to create a new output page. If the user chooses to create a new output page, the requestor identifier is sent to the server system along with the request to create a new output page and the server system assigns a new output identifier and sends the identifier to the client system. If the user chooses to add a new output specification to an existing output page, the user selects the relevant page and the output identifier is set at the client system.

The user is then presented with a web page, FIG. 2K, showing output specifications information that may be entered for the chosen output identifier. This example web page contains a field selection section 204 containing a listing of fields that may be displayed on the output web page and a display details section 205 containing various display options. In one embodiment the listing in the field selection section 204 is derived from the database fields previously defined in the input specifications database 116 for that requestor identifier. One skilled in the art would appreciated that these sections can be rearranged, adapted or omitted in various ways. When the user enters the field information and selects Submit, the information is sent along with the requestor identifier and the output identifier. The server system returns a confirming web page FIG. 2L.

Figure 2N:
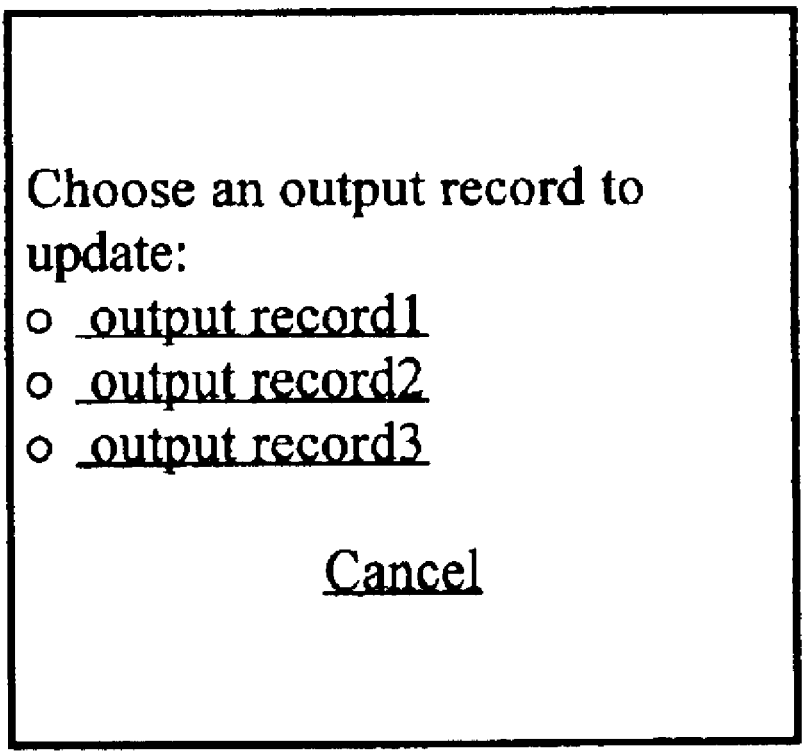

If Update Output Specifications is chosen, the user is presented with a selection page FIG. 2M listing previously entered output pages. The user selects the relevant output page and the output identifier is set at the client system. The user is then presented with a web page, FIG. 2N, showing output specifications records for the chosen output page. The user selects the relevant output specifications record and the output record identifier is set at the client system. The user is then presented with a web page, FIG. 2O, showing output specifications information that have previously been entered. When the user edits the entry to his or her satisfaction and selects Submit, the information is sent along with the requestor identifier, output identifier and output record identifier. The user is then presented with a confirming web page FIG. 2P.

When an end-user interacts with the system, he or she must provide a requestor identifier for each request.

To obtain a search result display, the client uses a web page such as FIG. 2Q to send end-user search information along with the requestor identifier and output identifier to the server system. For instance, FIG. 2Q shows an entry to view all members who have signed-up for a golf tournament and who have a skill level value of 4. The requestor identifier and output identifier can be included in the Universal Resource Locator and a URL for a request might be http://www.centranet.com/outputinfo.html?rid=xxx&oid=zzz, where xxx represents a requester identifier and zzz represents an output identifier. After the user enters the end-user search information and selects Submit, the information is sent along with the requester identifier and output identifier. The flow described in FIG. 3A below is executed. The user is then presented with a web page FIG. 2R showing the results of the request. FIG. 2R is an example of the results of the output specifications in FIG. 4C and FIG. 4D.

To enter end-user data, the client uses a web page FIG. 2S to send user input information including the requestor identifier and input identifier to the server system. For instance, FIG. 2S shows an entry to enter sign-up information into a golf tournament sign-up page where the user enters name, e-mail and skill level information. A URL for a request might be http://www.centranet.com/inputinfo.html?rid=xxx&iid=yyy, where xxx represents a requestor identifier and yyy represents an input identifier. FIG. 2S is an example of the results of the input specifications in FIG. 4A and FIG. 4B. After the user enters the information and selects Submit, the information is sent along with the requestor identifier and input identifier. The flow described in FIG. 3B below is executed. The user is then presented with a web page FIG. 2T confirming the input request.

One skilled in the art would appreciate that the web pages in FIG. 2Q and FIG. 2S can be generated by the server system or generated externally.

Figure 3A:
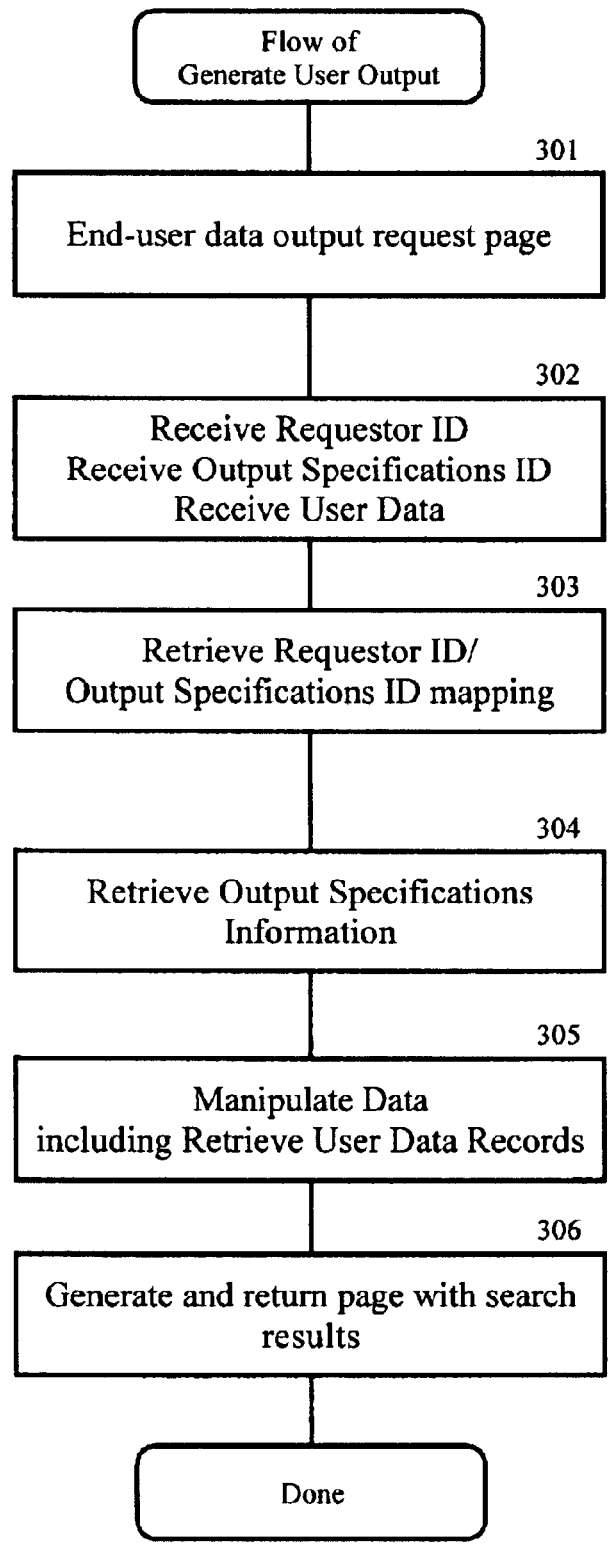
FIG. 3A is a flow diagram of a routine used by an end-user to generate a web page search result in which a requestor identifier and an output identifier is sent to the server system.

FIG. 3A is a flow diagram of a routine to generate a web page search result in which a requester identifier and an output identifier is sent to the server system.

Each time end-user search information is sent in step 301 from an entry page such as FIG. 2Q an output identifier and requestor identifier are also sent. In step 302, the server system receives the end-user search information, requestor identifier and output identifier. In step 304 the server system retrieves from the output specifications database 117 the records associated with the selected requester identifier-output identifier combination by first retrieving the mapping information from the requestor identifier/output table 114 in step 303. The output specifications includes database field information and field display information which were previously entered into the output specifications database 117. In step 305 the server system uses the end-user search information to retrieve the relevant records from the user input database 118. One skilled in the art would appreciate that the use of the end-user search information in the query of the data in the end-user input database 118 in step 305 is separated from the use of the identifiers in the query of the data in the output specifications database 117 in step 304 and provides a design through which the use of the associated identifiers is essential to the flexibility of the system permitting, for instance, other output pages to use the same end-user data records in the end-user input database 118 while using different records in the output specifications database 117. In step 306, the server system uses the retrieved output specifications information from step 304 and the user database information from step 305 to generate and send a web page to the client system in a page description language such as HTML for display on a browser. One skilled in the art would appreciated that the generated page in 306 can be generated and sent in other forms such as in an electronic mail message.

One skilled in the art would also appreciated that further authentication such as password authentication can be required at step 305 to limit the display of information content to authorized users. As well further validation such as to ensure end-user search information is valid can be required at step 305.

For instance, following the above description, if a user wishes to view all members who have signed-up for a golf tournament, the user submits this request along with the requestor identifier and the output identifier for this display screen to the server system in step 301 using a web page such as FIG. 2Q. In step 302, the server system receives the end-user search information, requester identifier and output identifier. In step 304 the server system retrieves from the output specifications database 117 the records associated with the selected requestor identifier-output identifier combination by first retrieving the mapping information from the requestor identifier/output table 114 in step 303. The output specifications include database field information (e.g. name, e-mail, skill level) and field display information (e.g. name font color is green) which were previously entered into the output specifications database 117. In step 305 the server system uses the end-user search information to retrieve the relevant records from the end-user input database 118 which contains previously entered golf tournament sign-up information. In step 306, the server system uses the output specifications information from step 304 and the user input database information from step 305 to send a web-page containing a listing of all members who have signed-up for the tournament.

Figure 3B:
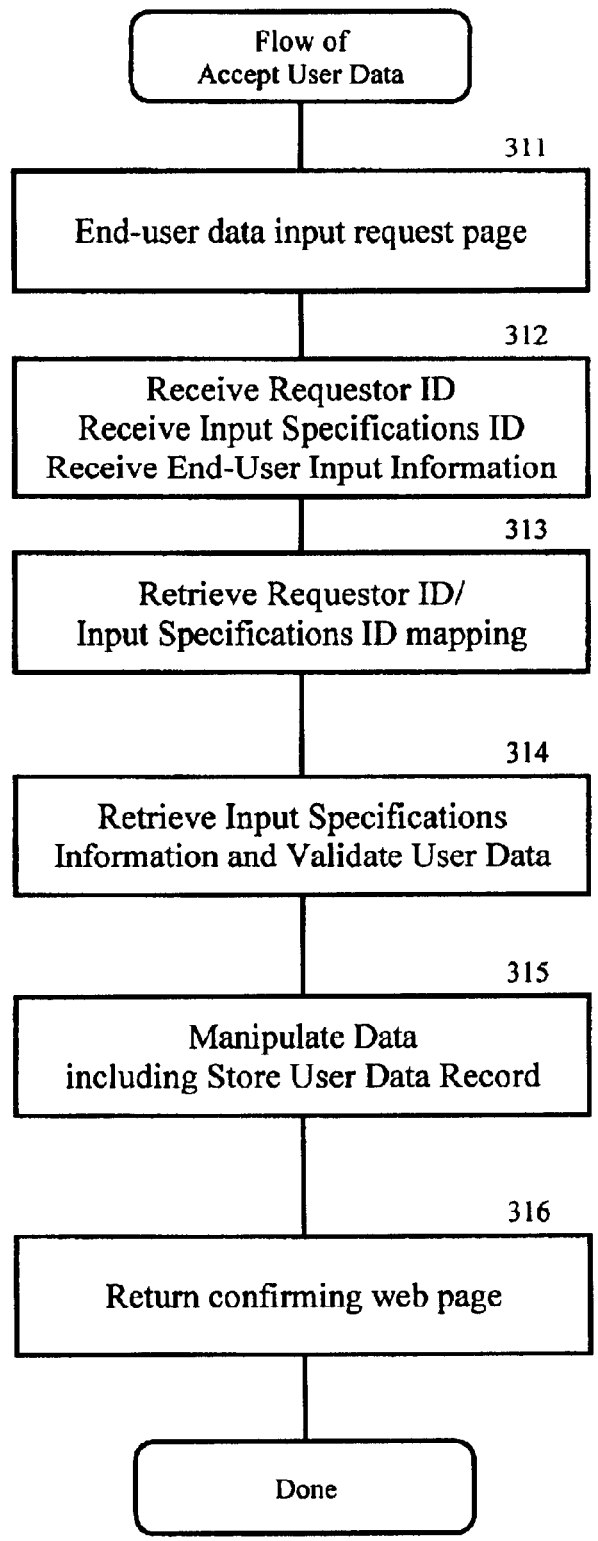
FIG. 3B is a flow diagram of a routine used by an end-user to input user data in which a requestor identifier and an input identifier is sent to the server system.

FIG. 3B is a flow diagram of a routine to input user data in which a requestor identifier and an input identifier is sent to the server system.

Each time end-user input information is sent in step 311 from an entry page such as FIG. 2S an input identifier and requester identifier are also sent. In step 312, the server system receives the end-user input information, requestor identifier and input identifier from the client system. In step 314 the server system retrieves from the input specifications database 116 the records associated with the selected requester identifier-input identifier combination by first retrieving the mapping information from the requestor identifier/input table 113 in step 313. The input specifications includes database field information and may include field validation information which were previously entered into the input specifications database 116. In step 315 the server system uses the retrieved input specifications information from step 313 and end-user input information from step 312 along with the requestor identifier and input identifier to generate and store a data entry record in the end-user input database 118. One skilled in the art would appreciate that the use of the identifiers permits the separation of the end-user data from the input specifications permitting, for instance, other input pages to record the same end-user data information in the end-user input database 118 while using different records in the input specifications database 116. In step 316, the server system sends a confirming web page, FIG. 2T, to the client system in a page description language such as HTML for display on a browser.

One skilled in the art would appreciated that further validation such as checking for input field length can be required at step 315 to limit the input of information to requestor specifications if this requirement was previously entered into the input specifications database 116. One skilled in the art would also appreciated that further authentication such as password authentication can be required at step 315 to limit the input of information to authorized users.

For instance, following the above description, if a user wishes to enter sign-up information into a golf tournament page, the user would enter name, e-mail and skill level information in step 311 using a web page such as FIG. 2S and submit the page, together with the requestor identifier and the input identifier to the server system. In step 312, the server system receives the end-user input information, requester identifier and input identifier from the client system. In step 314 the server system retrieves from the input specifications database 116 the records associated with the requestor identifier-input identifier combination by first retrieving the mapping information from the requestor identifier/input specifications table 113 in step 313. The input specifications may include database field information such as which database fields are used (e.g. the name, e-mail and level database fields are used) and validation information (e.g. the name field cannot be a null string) which were previously entered into the input specifications database 116. In step 315 the server system uses the retrieved input specifications information from step 313 and the user input information from step 312 to check the validity of the user input information and to generate and store a data entry record in the user input database 118. In step 316, the server system sends a confirming web page, FIG. 2T, to the client system in a page description language such as HTML for display on a browser.

Figure 4A:
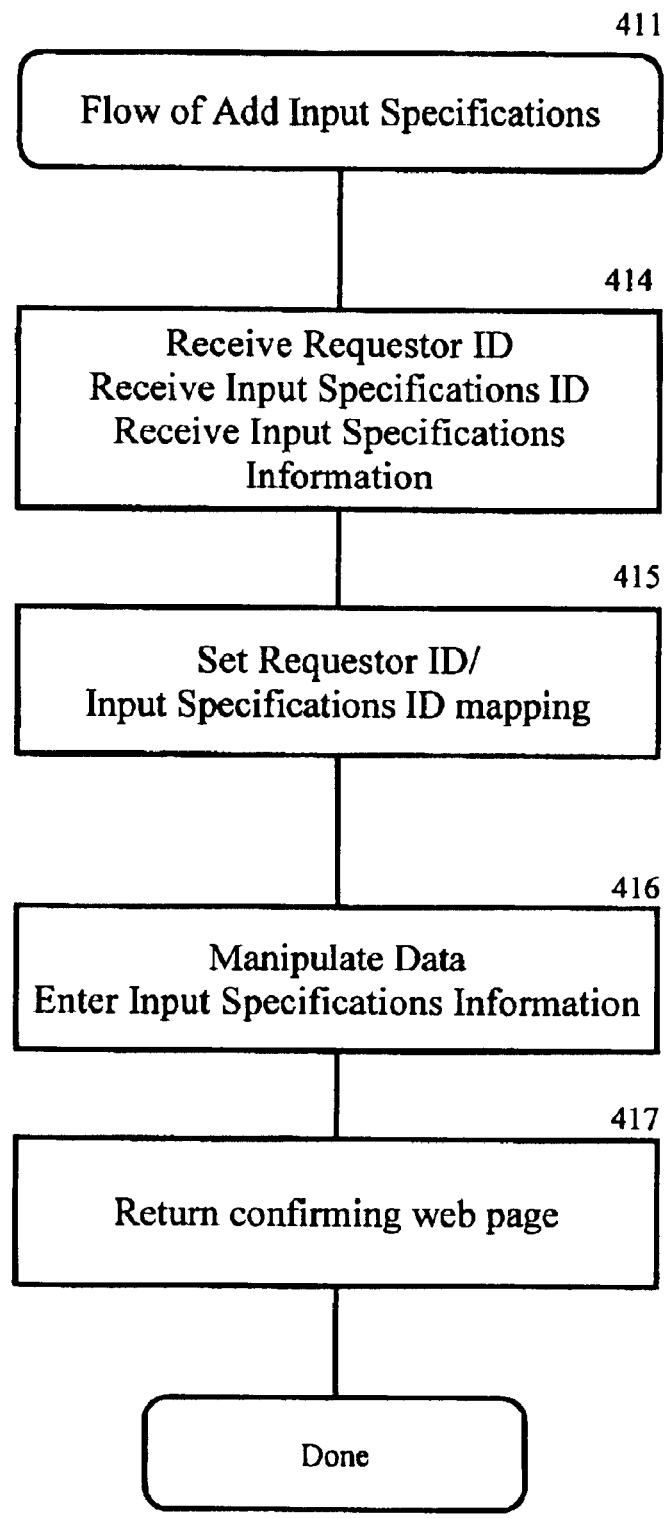
FIG. 4A is a flow diagram of a routine used by a Requestor to add input page specifications in which a requester identifier and an input identifier is sent to the server system.

FIG. 4A is a flow diagram of a routine to add input page specifications in which a requestor identifier and an input identifier is sent to the server system.

Each time information is sent in step 411 from an entry page such as FIG. 2D an input identifier and requestor identifier are also sent. In step 414, the server system receives the requester identifier and input identifier along with the input specifications information. In step 415 the identifier information is used to maintain the mappings between the input specifications information and the requestor identifier-input identifier combination and is stored in the requestor identifier/input identifier table 113 along with a reference to the input specifications information in the form of an assigned input record identifier. In step 416, the server system creates a new input specifications record and the input specifications information is stored in the input specifications database 116 along with the input record identifier. In step 417, the server system sends a confirming web page such as FIG. 2E to the client system in a page description language such as HTML for display on a browser.

One skilled in the art would appreciate that the use of the input record identifier can be omitted if the requestor identifier and input identifier information is stored together with the input specifications information in the input specifications database 116.

For example, if a user wishes to gather golf tournament sign-up information, relevant input specifications may include fields for collecting name, e-mail and skill level. Using a web page such as FIG. 2D in step 411, the user selects "text" for the field type, enters "golfer name" for the field display name and selects "required field" for validation. After the user selects Submit, the information including the requester identifier and input identifier is sent to the server. In step 414, the server system receives the requester identifier and input identifier along with the input specifications information. In step 415 the identifier information is used to maintain the mappings between the input specifications information and the requester identifier-input identifier and is stored in the requestor identifier/input identifier table 113 along with a reference to the input specifications information in the form of an assigned input record identifier. In step 416, the server system creates a new input specifications record and the input specifications information (i.e. field type, display details and validation details) is stored in the input specifications database 116 along with the input record identifier. In step 417, the server system sends a confirming web page such as FIG. 2E to the client system in a page description language such as HTML for display on a browser. The user can repeat the above steps to enter similar information for the e-mail and skill level fields.

Figure 4B:
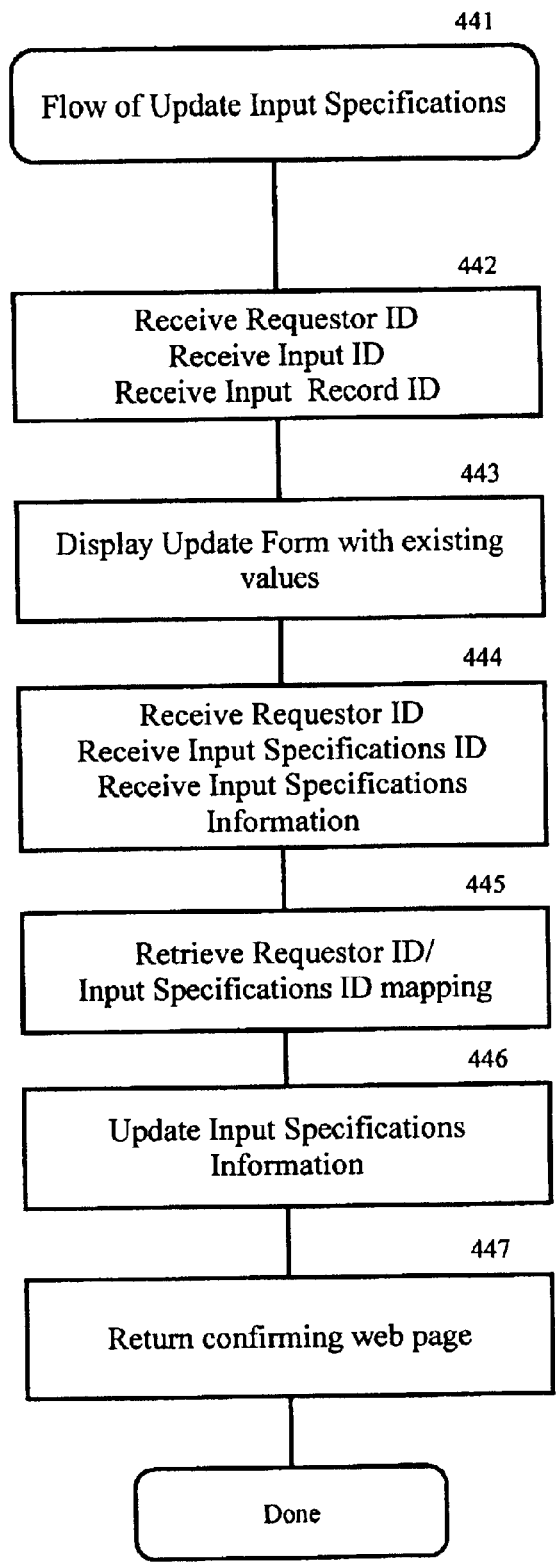
FIG. 4B is a flow diagram of a routine used by a Requestor to update an input page specification in which a requester identifier and an input identifier is sent to the server system.

FIG. 4B is a flow diagram of a routine to update an input page specification in which a requestor identifier and an input identifier is sent to the server system.

If the user chooses to update an existing input specifications record the user is provided with an entry page or pages such as FIG. 2F and FIG. 2G in step 441 allowing the selection of the desired input specifications record as identified by the input record identifier as well as the associated input identifier. In step 442, the server system receives the input record identifier, input identifier and the requestor identifier for the desired record and the server system retrieves the previously stored input specifications information from the input specifications database 116 using the mappings in the requester identifier/input table 113. In step 443, the server system sends an entry page such as FIG. 2H containing the retrieved input specifications information corresponding to the requestor identifier, input identifier and input record identifier to the client system. After the user has edited the entry page to his or her satisfaction the user selects Submit and sends the information, along with the requestor identifier, input identifier and input record identifier to the sever system. In step 444, the server system receives the requestor identifier, input identifier and input record identifier along with the updated input specifications information. In step 445 the identifier information is used to retrieve the mappings between the input specifications information and the requester identifier-input identifier-input record identifer combination from the requestor identifier/input identifier table 113. In step 446, the server system updates the input specifications record in the input specifications database 116 using the requestor identifier, input identifier, input record identifier and the updated input specifications information. In step 447, the server system sends a confirming web page such as FIG. 2I to the client system in a page description language such as HTML for display on a browser.

Figure 4C:
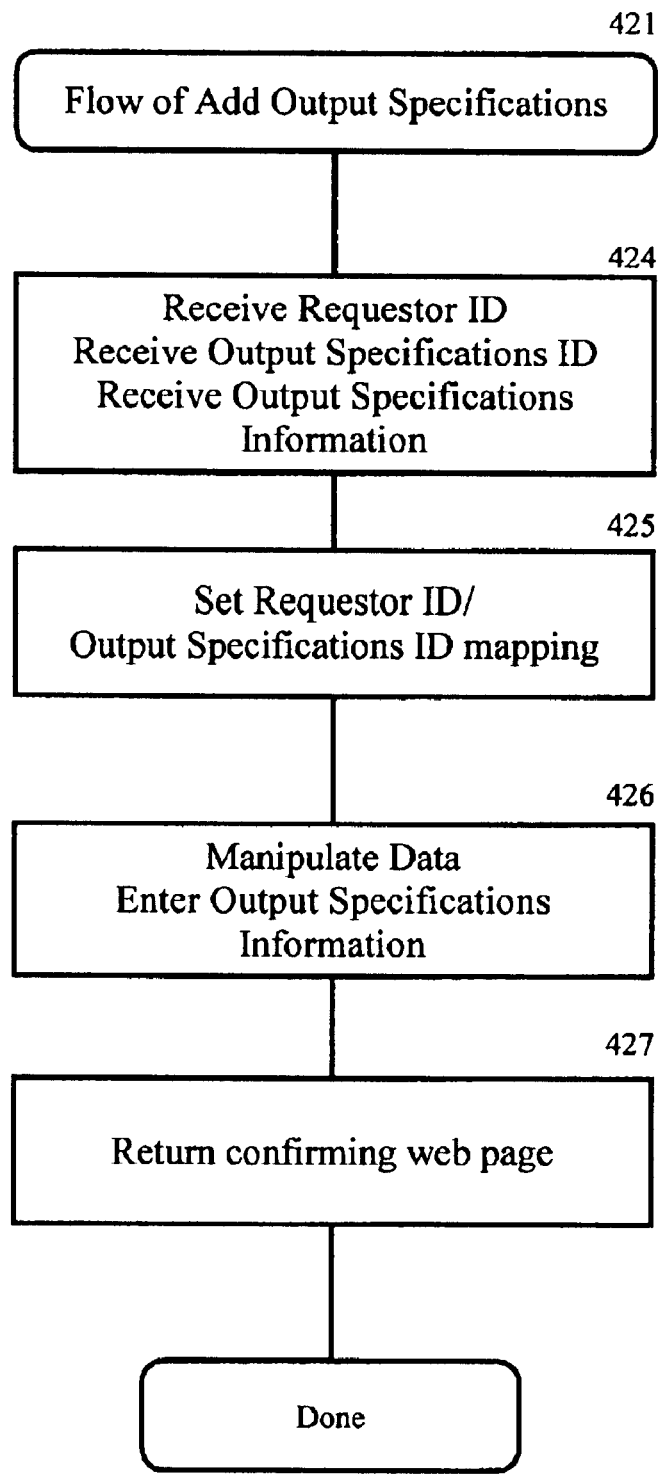
FIG. 4C is a flow diagram of a routine used by a Requestor to add an output page specification in which a requestor identifier and an output identifier is sent to the server system.

FIG. 4C is a flow diagram of a routine to add an output page specification in which a requestor identifier and an output identifier is sent to the server system.

Each time information is sent from an output specifications page such as FIG. 2K an output identifier and requestor identifier are also sent. In step 424, the server system receives the requester identifier and output identifier along with the output specifications information. In step 425 the identifier information is used to maintain the mappings between the output specifications information and the requestor identifier-output identifier combination and is stored in the requester identifier/output identifier table 114 along with a reference to the output specifications information in the form of an assigned output record identifier. In step 426, the server system creates a new output specifications record and the output specifications information is stored in the output specifications database 117 along with the output record identifier. In step 427, the server system sends a confirming web page, FIG. 2T, to the client system in a page description language such as HTML for display on a browser.

For instance, if a user wishes to output golf tournament sign-up information, relevant output specifications may include fields for the display of name, e-mail and skill level information if they were previously entered in the input specifications database 116 for that requester identifier. Using a form such as FIG. 2K, the user enters Name in the field selection section and green in the display details section. After the user selects the submit button, the information including the requester identifier is sent to the server. In step 424, the server system receives the requestor identifier and output identifier along with the output specifications information such as the field selection and display details. In step 425 the identifier information is used to maintain the mappings between the output specifications information and the requestor identifier-output identifier combination and is stored in the requestor identifier/output identifier table 114 along with a reference to the output specifications information in the form of an assigned output record identifier. In step 426, the server system creates a new output specifications record and the output specifications information is stored in the output specifications database 117 along with the output record identifier. In step 427, the server system sends a confirming web page to the client system in a page description language such as HTML for display on a browser. The user can then proceeds to enter more fields to display for this screen including the e-mail and skill level.

Figure 4D:
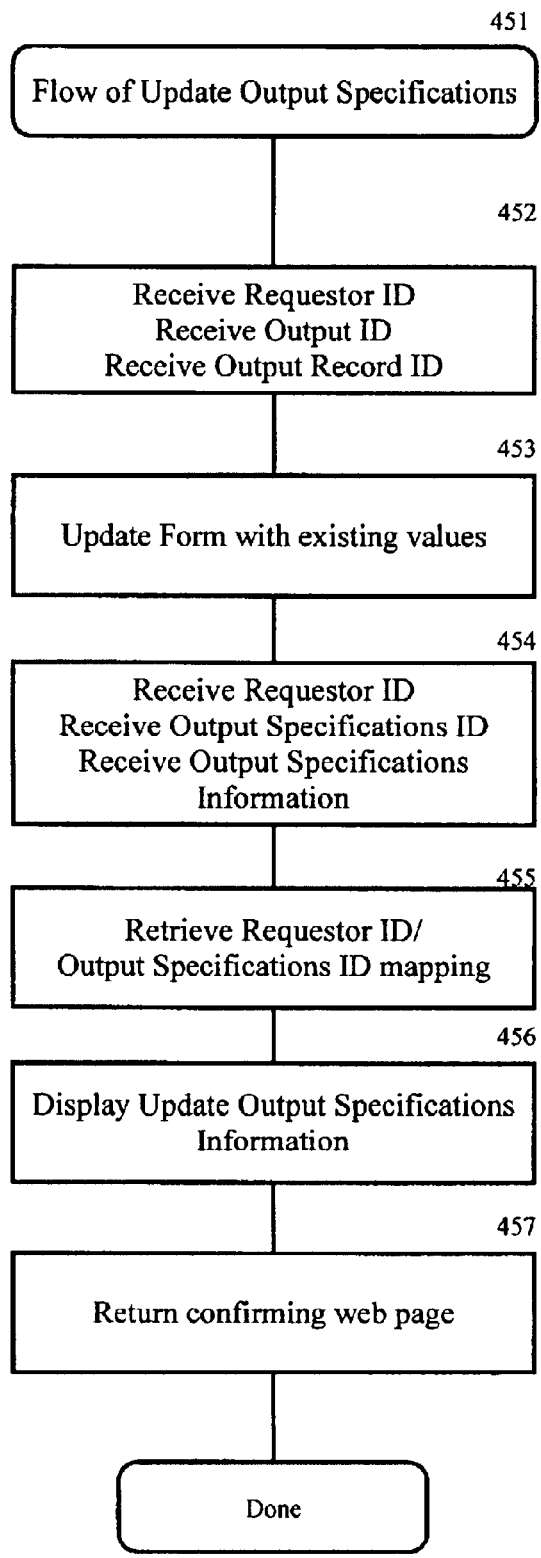
FIG. 4D is a flow diagram of a routine used by a Requestor to update an output page specification in which a requester identifier and an output identifier is sent to the server system.

FIG. 4D is a flow diagram of a routine to update an output page specification in which a requestor identifier and an output identifier is sent to the server system. If the user chooses to update an existing output specifications record the user is provided with an entry page or pages such as FIG. 2M and FIG. 2N in step 451 allowing the selection of the desired output specifications record as identified by the output record identifier as well as the associated output identifier. In step 452, the server system receives the output record identifier, output identifier and the requestor identifier and the server system retrieves the previously stored output specifications information from the output specifications database 117 using the mappings in the requester identifier/output table 114. In step 453, the server system sends an entry page such as FIG. 2O containing the retrieved output specifications information corresponding to the requestor identifier, output identifier and output record identifier to the client system. After the user has edited the entry page to his or her satisfaction the user selects Submit and sends the information, along with the requestor identifier, output identifier and output record identifier to the server system. In step 454, the server system receives the requester identifier, output identifier and output record identifier along with the updated output specifications information. In step 455 the identifier information is used to retrieve the mappings between the output specifications information and the requestor identifier-output identifier-output record identifer combination from the requestor identifier/output identifier table 114. In step 456, the server system updates the output specifications record in the output specifications database 117 using the requestor identifier, output identifier, output record identifier and the updated output specifications information. In step 457, the server system sends a confirming web page such as FIG. 2P to the client system in a page description language such as HTML for display on a browser.

One skilled in the art will appreciate that other mechanisms can be used to maintain the correspondence of the output field specifications to ensure that it is defined as a subset of the input field specifications without departing from the spirit or essential character of the present invention.

Although the present invention has been described in various embodiments, it will be appreciated by those of ordinary skill in the art that the invention can be embodied in other forms without departing from the spirit or essential character thereof. The foregoing description is therefore to be considered illustrative and not restrictive. The scope of the invention is indicated by the appended claims, and all changes which come within the meaning and range of equivalents thereof are intended to be embraced therein.

What is claimed is:

1. A method of gathering and outputting information on a computer network where the requestor identifier is used both in the input specifications and output specifications permitting dynamic changes in input requirements and output characteristics comprising:

a requester assignment component providing a means for generating a unique Requestor Identifier for each authenticated requestor and a means for storing said Requestor Identifier in a data storage medium having a plurality of Requestor Identifiers;

an input-specification assignment component providing, for each requestor identifier, a means for accepting at least one input specification record and assigning a unique associated input identifier for each record or group of records and a means for storing said input identifier and requestor identifier in a data storage medium along with a reference to the input specification record or group of records;

an output-specification assignment component providing, for each requestor identifier, a means for accepting at least one output specification record and assigning a unique associated output identifier for each output specification record or group of records and a means for storing said output identifier and requester identifier in a data storage medium along with a reference to the output specification record or group of records;

a user-input receiving component providing a means for accepting input from users including requestor identifier and input identifier and a means for using the input specification record or records associated with the said requester identifier and said input identifier in the manipulation of user data; and a user-output receiving component providing a means for accepting input from users including requestor identifier and output identifier and a means for using the output specification record or records associated with the said requestor identifier and said output identifier in the manipulation of user data.

2. The method of claim in 1 wherein the manipulation of data is verifying input data.

3. The method of claim in 1 wherein the manipulation of data is placing data in a data storage medium.

4. The method of claim in 1 wherein the manipulation of data is sending data in an electronic mail message.

5. The method of claim in 1 wherein the input specification record is data field information.

6. The method of claim in 1 wherein the input specification record is field display information.

7. The method of claim in 1 wherein the input specification record is authentication information.

8. The method of claim in 1 wherein the manipulation of data is retrieving an element of data previously stored using the user-input receiving component.

9. The method of claim in 1 wherein the output specification record is data field information.

10. The method of claim in 1 wherein the manipulation of data is displaying data in a data display medium.

11. The method of claim in 1 wherein the output specification record is field display information.

12. A server system for gathering and outputting data comprising:

a data storage medium storing information for a plurality of requestors;

a data storage medium storing information for a plurality of end-users;

a requestor identifier assignment component providing a receiving component for receiving requests to generate a requestor identifier, a requestor identifier assignment component which generates a unique associated requestor identifier for each requestor, and a requestor identifier fulfillment component that completes the input of the requestor identifier information into the data storage medium;

a requestor data input specification component providing a receiving component for receiving requests to input requestor input information including an indication of one of the plurality of requestors, an input identifier assignment component that generates a unique associated input identifier for each record or group of records associated with the requestor input information, and a requestor input fulfillment component that completes the input of the requestor input information together with the associated requestor identifier and associated input identifier into the data storage medium;

a requestor data output specification component providing a receiving component for receiving requests to input requestor output information including an indication of one of the plurality of requestors, an output identifier assignment component that generates a unique associated output identifier for each record or group of records associated with the requestor output information, and a requestor output fulfillment component that completes the input of the requestor output information together with the associated requestor identifier and associated output identifier into the data storage medium;

an end-user data input component providing a receiving component for receiving requests to input end-user information including an indication of the requestor identifier and an indication of the input identifier, a data retrieval component that retrieves from the data storage medium information for the indicated requestor identifier and the indicated input identifier and uses the retrieved information to manipulate the end-user data input information for the indicated requestor in accordance with the requestor input information, and an end-user input fulfillment component that completes the input of the end-user information into the data storage medium; and an end-user data output component providing a receiving component for receiving requests to output end-user information including an indication of the requestor identifier and an indication of the output identifier, and a data retrieval component that retrieves from the data storage medium information for the indicated requester identifier and the indicated output identifier including at least one requestor output information and uses the retrieved information to manipulate the end-user data output information for the indicated requestor.

13. The method of claim in 12 wherein the end-user data output component further comprises:

an end-user output fulfillment component that completes the output of the end-user information onto a display component.

14. The method of claim in 12 wherein the manipulation of end-user data is retrieval.

15. The method of claim in 12 wherein the manipulation of end-user data is storage.

* * * * *